(12) United States Patent
Small et al.

(10) Patent No.: US 8,224,336 B2
(45) Date of Patent: *Jul. 17, 2012

(54) METHOD AND APPARATUS FOR IMPROVING NETWORK PERFORMANCE IN A COMMUNICATION SYSTEM

(75) Inventors: David Small, Dublin, CA (US); Canhui Ou, Sr., Danville, CA (US); Jonathan H. Roll, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/876,302

(22) Filed: Sep. 7, 2010

(65) Prior Publication Data

US 2010/0331002 A1    Dec. 30, 2010

Related U.S. Application Data

(63) Continuation of application No. 11/427,135, filed on Jun. 28, 2006, now Pat. No. 7,813,736.

(51) Int. Cl.
*H04W 40/00* (2009.01)

(52) U.S. Cl. ........................................ 455/445

(58) Field of Classification Search .................. 370/336, 370/338, 351, 389, 400, 401; 455/436–445
See application file for complete search history.

(56) References Cited

U.S. PATENT DOCUMENTS

| | | | |
|---|---|---|---|
| 5,590,133 | A | 12/1996 | Billstrom |
| 5,722,074 | A | 2/1998 | Muszynski |
| 5,959,981 | A | 9/1999 | Bruckert |
| 2001/0036172 | A1 | 11/2001 | Haskal |
| 2001/0036173 | A1 | 11/2001 | Shmulevich |
| 2002/0131434 | A1 | 9/2002 | Vukovic |
| 2005/0265251 | A1 | 12/2005 | Acharya |
| 2005/0281204 | A1 | 12/2005 | Karol |
| 2005/0286425 | A1 | 12/2005 | Nagesh |
| 2006/0067235 | A1 | 3/2006 | Acharya |
| 2006/0203737 | A1 | 9/2006 | Bugenhagen |

*Primary Examiner* — Nathan Mitchell
(74) *Attorney, Agent, or Firm* — Guntin Meles & Gust, PLC; Pablo Meles

(57) ABSTRACT

A method and apparatus is disclosed for improving network performance in a communication system. A system that incorporates teachings of the present disclosure may include, for example, a server having a controller to group a plurality of wireless base terminals (WBTs) into first and second groups that share at least one common WBT and select a resultant communication path for the at least one common WBT to a mobile telephone switching office based on differential delays associated with alternative communication paths for combinations of WBTs in at least one of the first and second groups. Additional embodiments are disclosed.

20 Claims, 4 Drawing Sheets

100

200

300

METHOD AND APPARATUS FOR IMPROVING NETWORK PERFORMANCE IN A COMMUNICATION SYSTEM

CROSS REFERENCE TO RELATED APPLICATIONS

This application is a Continuation of U.S. patent application Ser. No. 11/427,135 filed Jun. 28, 2006 by Small et al., entitled "METHOD AND APPARATUS FOR IMPROVING NETWORK PERFORMANCE IN A COMMUNICATION SYSTEM", which is incorporated herein by reference in its entirety.

This Application is related to U.S. Pat. No. 7,627,306, filed Jun. 28, 2006 and issued Dec. 1, 2009, by Small et al., entitled "Method and Apparatus for Maintaining Network Performance in a Communication System," which is incorporated herein by reference in its entirety.

FIELD OF THE DISCLOSURE

The present disclosure relates generally to communication systems, and more specifically to a method and apparatus for improving network performance in a communication system.

BACKGROUND

In a cellular system, wireless base terminals (WBTs) cover a wide geographic area utilizing frequency-reuse techniques. It is not uncommon for WBTs to have overlapping coverage areas to avoid null or dead spots that can cause dropped calls. In overlapping coverage areas it is possible for a mobile phone to submit a mobile origination call to a mobile telephone switching office (MTSO) by way of two or more WBTs.

In order for the MTSO to operate properly, mobile phone operators expect signals received by the MTSO to not exceed for example a maximum latency and maximum jitter. Furthermore, signals from multiple WBTs must arrive at the MTSO within a set time period in order to be identified as part of the same call stream. This time period is known as differential delay. Current mobile telephony backhaul networks are served by circuit-switched elements (e.g., T1 lines), which have very short delay since bits are transmitted at nearly the speed of light.

As telephone companies reduce cost, increase features, and reliability, alternative backhaul technologies are being considered: Ethernet over Copper, Ethernet over Fiber, WiMAX, SONET, NG-SONET, and so on. With the growth of packet-switched (vs. circuit-switched) multi-hop backhaul, and the variability in packet delivery times, differential delay can become a significant problem for legacy MTSOs receiving WBT signals over packet-switched networks.

A need therefore arises for a method and apparatus for improving network performance in a communication system.

DETAILED DESCRIPTION

Embodiments in accordance with the present disclosure provide a method and apparatus for improving network performance in a communication system.

In an embodiment of the present disclosure, a method can include grouping a plurality of wireless base terminals (WBTs) into first and second groups that share at least one common WBT; and selecting a resultant communication path for the at least one common WBT to a mobile telephone switching office (MTSO) based on differential delays associated with alternative communication paths for one or more other WBTs in the first and second groups.

In another embodiment of the present disclosure, a non-transitory computer-readable storage medium can include computer instructions for grouping a plurality of wireless base terminals (WBTs) into first and second groups that share at least one common WBT; and selecting a resultant communication path for the at least one common WBT to a mobile telephone switching office (MTSO) based on performance parameters associated with alternative communication paths for combinations of WBTs in the first and second groups.

In another embodiment of the present disclosure, a server can include a controller to group a plurality of wireless base terminals (WBTs) into first and second groups that share at least one common WBT; and select a resultant communication path for the at least one common WBT to a mobile telephone switching office (MTSO) based on differential delays associated with alternative communication paths for combinations of WBTs in at least one of the first and second groups.

Figure 1:
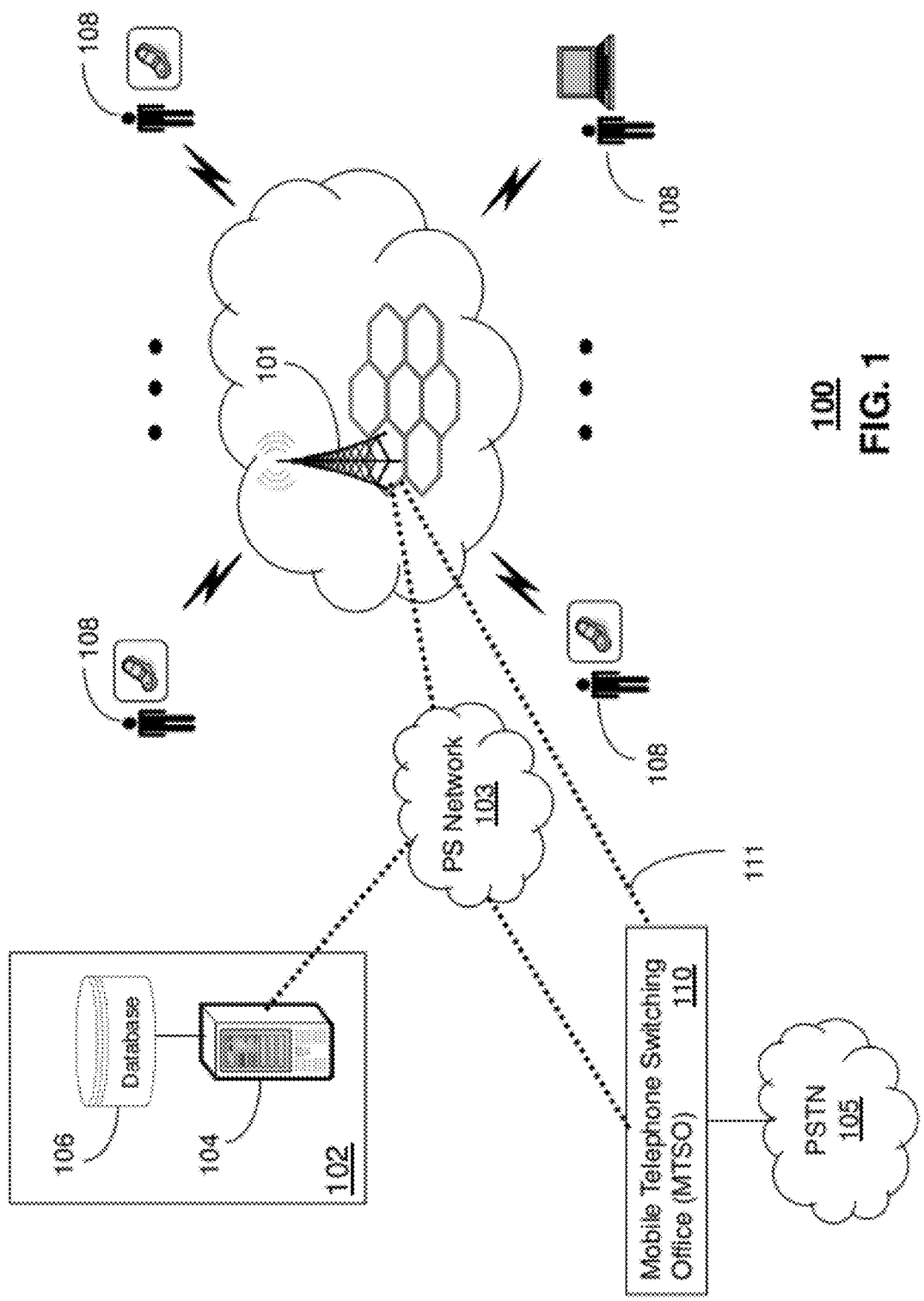
FIG. 1 depicts an exemplary embodiment of a communication system.

FIG. 1 depicts an exemplary embodiment of a communication system 100. The communication system 100 can comprise a plurality of wireless base terminals (WBTs) 101, also commonly referred to as base stations, distributed throughout a network under a frequency-reuse methodology to provide wireless services to roaming end users 108 over a large geographic region (such as a city, state or nation). The end users can use any wireless device capable of communicating with the WBTs 101 including without limitation mobile phones, cellular-capable PDAs, and computing devices such as laptops equipped with a cellular interface. Any current or next generation cellular communications technology can be applied to the WBTs 101 and end user devices 108 including without limitation GSM/GPRS, CDMA-1X, EVDO, UMTS, software defined radio (SDR), WiMAX, and/or ultra wide band (UWB).

The WBTs 101 can relay mobile origination (MO) calls initiated by an end user device 108 to a mobile telephone switching office (MTSO) 110 by way of a packet-switched (PS) network 103 conforming to for example the Internet Protocol or more sophisticated protocols such as multi-protocol label switching or MPLS. Alternatively, MO calls can be communicated directly from the WBT 101 to the MTSO 110 by way of dedicated or leased lines such as a T1 line carrying packetized traffic. An MTSO 110 houses switches and computers to which all WBTs 101 in an area are connected for the purpose of eventual connection to the public switched telephone network (PSTN) 105. The MTSO 110 handles the connection, tracking, status and billing of all wireless call activity in an assigned area.

A network management system (NMS) 102 can be utilized for programming the PS network 103 so that a mobile origination call processed by more than one WBT 101 conforms to the operating characteristics of the MTSO 110. In particular the NMS 102 provisions network elements (such as routers) of the PS network 103 so that MTSO 110 requirements for differential delay, path delay and jitter are satisfied for combinations of WBTs 101 processing the same mobile origination call of a select wireless mobile device. To accomplish this, the NMS 102 can utilize a controller 104 and associated database 106 that stores network topology information of the communication system 100. The controller 104 utilizes common computing technology such as a scalable server to manage the operations of the network elements of the PS network 103 as will be described shortly.

Figure 2:
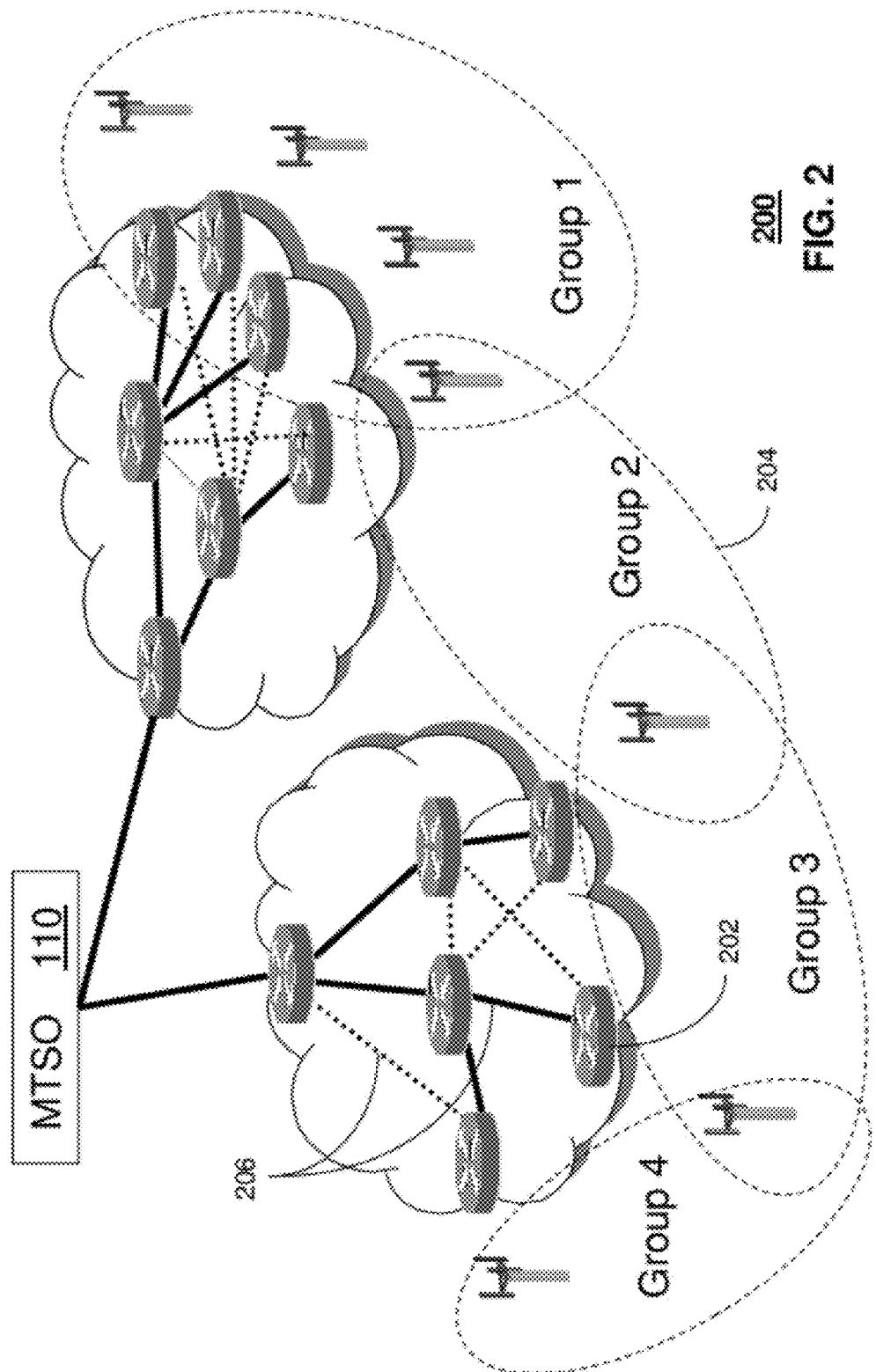
FIGS. 2-3 depict an exemplary method operating in the communication system.
Figure 3:
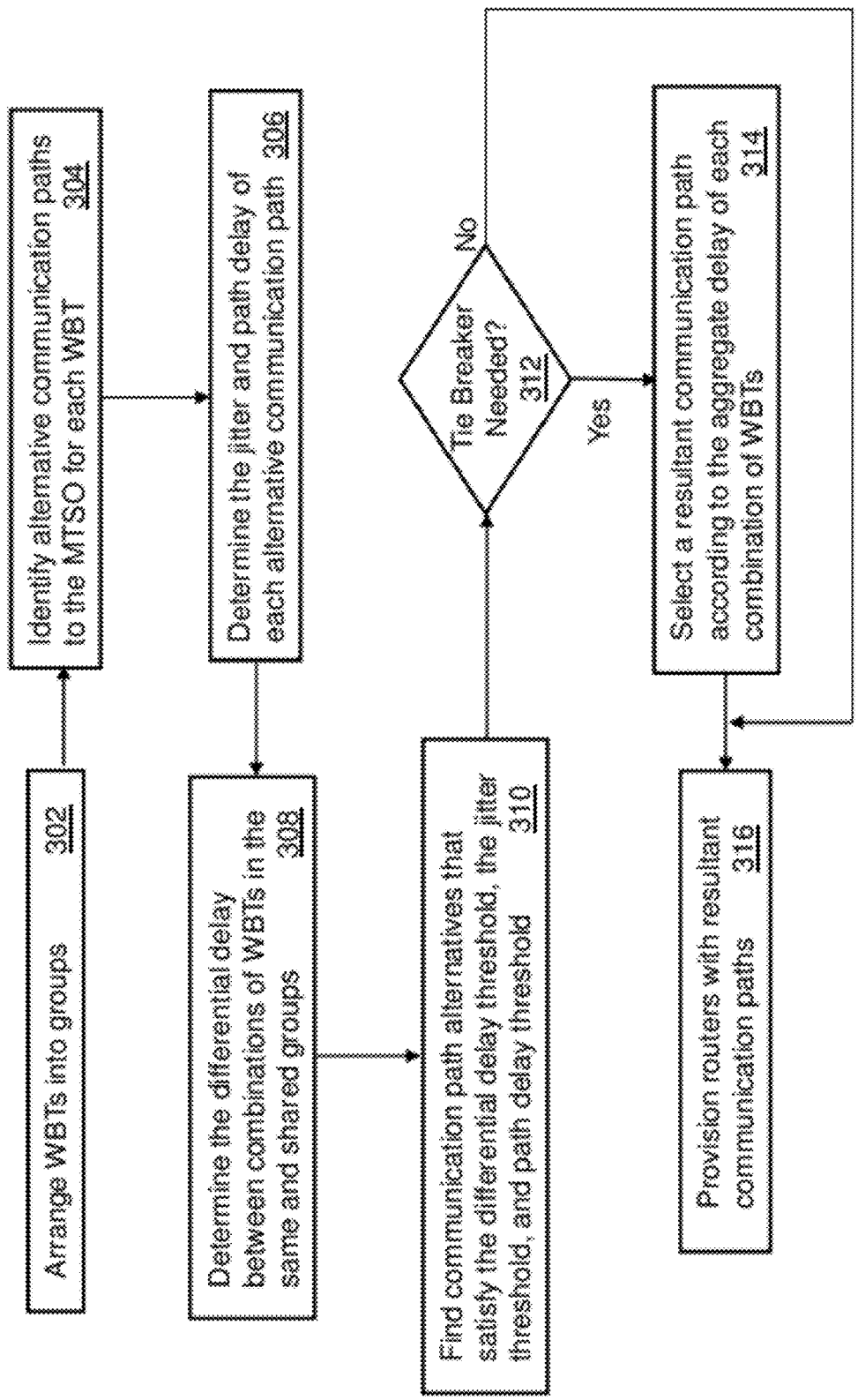

FIGS. 2-3 depict an exemplary method 300 operating in the communication system 100. FIG. 2 depicts a detailed view of the WBTs 101 coupled to the MTSO 110 by way of a number of network elements 202 (herein referred to as routers 202 for exemplary purposes only). The routers 202 at the edges of the PS network 103 are coupled to corresponding WBTs 101. Each WBT 101 is assigned to a single router 202. For purposes of the present illustration, the PS network 103 can be assumed to operate according to an MPLS protocol. Because of the dynamic nature of packet switching networks, there are many alternative communication paths 206 that can be chosen between a particular WBT 101 and the MTSO 110. The ad hoc nature of such networks can have an adverse effect on the MTSO 110 when combinations of WBTs 101 are serving the same mobile communication device 108. To be compliant with the MTSO 110 requirements for differential delay, path delay, and jitter, the NMS 102 can be programmed to provision the routers 202 according to method 300 as depicted in FIG. 3.

Method 300 can begin with step 302 in which the NMS 102 can be programmed to arrange the WBTs 101 into groups 204 such as depicted in FIG. 2 with overlapping coverage areas having one or more shared WBTs therebetween. In step 304, the NMS 102 can be programmed to identify alternative communication paths to the MTSO 110 for each WBT 101. The alternative communication paths can be determined according to a number of common path determination algorithms. For example, up to K alternative communication paths (K being an integer) can be determined from a shortest path algorithm such as presented in an article entitled, "Finding the K Shortest Loopless Paths in a Network," authored by J. Y. Yen, published July 1971 by Management Science, pp. 712-716, the contents of which are expressly incorporated herein in its entirety. In view of the Yen algorithm, the solid and dotted links 206 between routers 202 can represent a number of shortest loopless alternative communication paths to the MTSO 110 for each of the WBTs 101 solved thereby.

Once a number of alternative communication paths to the MTSO 110 have been identified for each WBT 101, the NMS 102 can be programmed to proceed to step 306 where it calculates expected distortions such as jitter and path delay for each alternative communication path. Jitter is the variation in delay between packets.

Knowing the path delays of each alternative communication path, the NMS 102 can proceed to step 308 where it determines the differential delay between combinations of WBTs 101 within a group and in shared groups 204. In the illustration of FIG. 2, each group has a shared WBT 101. Accordingly differential delays are calculated between WBTs 101 of group 4 according to combinations of alternative communication paths associated with these WBTs 101. The same calculations are applied to groups 3, 2 and 1. The differential delays are determined by calculating the difference between path delays in alternative communication paths of combinations of WBTs 101 serving the same mobile communication device 108. The alternative communication paths can be packet switched paths by way of the PS network 103 and/or dedicated leased lines 111.

In step 310, the NMS 102 can be programmed with common linear equation techniques to find communication path alternatives between the MTSO 110 and each WBT 101 that satisfy a differential delay threshold (e.g., less than or equal to 15 ms), a jitter threshold, and path delay threshold (e.g., less than or equal to 25 ms). In situations in which WBTs 101 have more than one communication path solution to the MTSO 110 that satisfy the criteria of step 310, the NMS 102 can be programmed according to steps 312-314 which applies a tie-breaker algorithm. In step 314, the NMS 102 can be programmed to select a resultant communication path for each WBT 101 from a select one of the communication path alternatives having a lowest aggregate delay summed over the combinations of WBTs 101. If on the other hand, a single solution is found for all of the WBTs 101 of FIG. 2, then the NMS 102 can proceed from step 312 to step 316 where it provisions the routers 202 according to the resultant communication path for each WBT 101.

Provisioning step 316 can represent for example the organization of label switched path links between the routers 202 in order to establish the resultant communication path for each WBT 101 to the MTSO 110. Step 316 is depicted by the solid lines between each router 202 serving a WBT 101 at the edge of the PS network 103. The dotted lines represent alternative communication paths that did not satisfy one or more of the aforementioned criteria of steps 306-314.

In an exemplary embodiment, the following linear equations can be applied to method 300 to accomplish the results of FIG. 2 with more than one path between the WBTs 101 and corresponding edge routers 202.

$p_x^k$: 0 if the $k^{th}$ ($1 \leq k \leq K$) alternative communication path for WBTx is not selected, where WBTx belongs to all the WBTs 101 in a group 204.

$p_x^k$: 1 if the $k^{th}$ ($1 \leq k \leq K$) alternative communication path for WBTx is selected.

$d_x^k$ is the path delay of the $k^{th}$ ($1 \leq k \leq K$) alternative communication path for WBTx.

$j_x^k$ is the worst case jitter of the $k^{th}$ ($1 \leq k \leq K$) alternative communication path for WBTx.

$t_x^{k,l}$: 1 if the $k^{th}$ ($1 \leq k \leq K$) path for WBTx traverses link l; 0 otherwise (note $t_x^{k,l}$ is given, not calculated by the formula below).

T: an integer temp variable.

The objective is to minimize the aggregate delay among the alternatives of communication paths to the MTSO 110

$$W \times \left( \sum_x \sum_k p_x^k \times d_x^k \right) + T,$$

where W is a weighting factor, which the foregoing equation is subject to:

$p_{x1}^{k1} \times d_{x1}^{k1} - p_{x2}^{k2} \times d_{x2}^{k2} \leq A$, $k_1 \geq 1$, $k_2 \leq K$, $x_1 \neq x_2$ for WBTs 101 belonging to the same groups 204, wherein A is the differential delay threshold;

$p_x^k \times d_x^k \leq B$, wherein B is the path delay threshold;

$p_x^k \times j_x^k \leq C$, wherein C is the distortion threshold (e.g., jitter tolerance threshold);

$$\sum_k p_x^k = 1$$

only one resultant communication path can be selected for each WBT 101; and $$\sum_x \sum_k p_x^k \times t_x^{k,l} \le T,$$

for each link l.

It should be evident from the above formulations that shared WBTs 101 create dependencies between shared groups 206 for calculating resultant communication paths. Thus in the illustration of FIG. 2, groups 1-4 require a holistic approach to determining resultant communication paths for the WBTs 101 in said groups. For example, the WBT 101 shared between groups 3-4 has an effect on resultant communications paths solved for groups 2 and 1, and vice-versa.

There are many algorithms other than those described above that can be used to solve for resultant communication paths between the MTSO 110 and WBTs 101 that satisfy the operational criteria set forth by the MTSO 110. It would be evident therefore to an artisan with ordinary skill in the art that the aforementioned embodiments can be modified, reduced, or enhanced without departing from the scope and spirit of the claims described below. Accordingly, the reader is directed to the claims below for a fuller understanding of the breadth and scope of the present disclosure.

Figure 4:
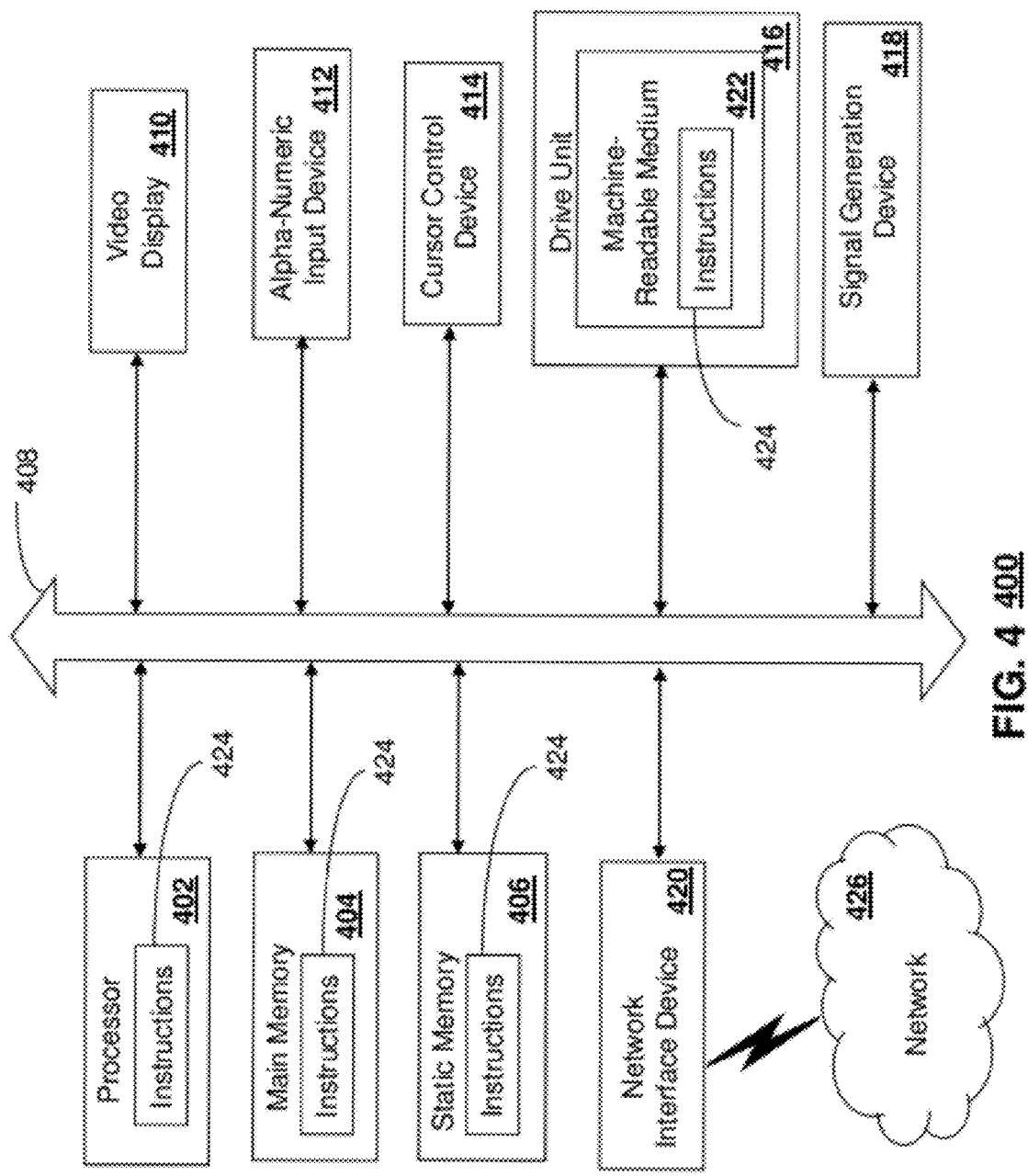
FIG. 4 depicts an exemplary diagrammatic representation of a machine in the form of a computer system within which a set of instructions, when executed, may cause the machine to perform any one or more of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   grouping a plurality of wireless base terminals into first and second groups that share at least one common wireless base terminal;
   provisioning at least one network element of a communication system to establish a resultant communication path between the at least one common wireless base terminal and a mobile telephone switching office based on differential delays associated with alternative communication paths for one or more other wireless base terminals in the first and second groups; and
   wherein the one or more other wireless base terminals are combinations of wireless base terminals in the first and second groups, and wherein the at least one network element comprises at least one router.

2. The method of claim 1, wherein the one or more other wireless base terminals are combinations of wireless base terminals in the first and second groups, and wherein the at least one network element comprises at least one router.

3. The method of claim 1, comprising determining the alternative communication paths based on a distance between the one or more other wireless base terminals and the mobile telephone switching office.

4. The method of claim 1, comprising selecting the resultant communication path based on path delays calculated for at least a portion of the alternative communication paths.

5. The method of claim 4, comprising selecting the resultant communication path based on distortions calculated for at least a portion of the alternative communication paths.

6. The method of claim 1, comprising selecting for each wireless base terminal in a select one of the first and second groups a communication path to the mobile telephone switching office based on the differential delays, path delays, and distortions associated with alternative communication paths to the mobile telephone switching office for combinations of wireless base terminals in the select one of the first and second groups.

7. The method of claim 6, wherein the distortions comprise jitter.

8. A non-transitory computer-readable storage medium comprising computer instructions for:
   grouping a plurality of wireless base terminals into first and second groups that share at least one common wireless base terminal; and
   selecting a resultant communication path for the at least one common wireless base terminal to a mobile telephone switching office based on performance parameters associated with alternative communication paths for combinations of wireless base terminals in the first and second groups.

9. The non-transitory computer-readable storage medium of claim 8, wherein the performance parameters comprise differential delays.

10. The non-transitory computer-readable storage medium of claim 8, wherein the performance parameters comprise jitter.

11. The non-transitory computer-readable storage medium of claim 8, wherein the performance parameters comprise path delays.

12. The non-transitory computer-readable storage medium of claim 8, wherein the performance parameters comprise path delays, jitter and differential delays.

13. The non-transitory computer-readable storage medium of claim 8, comprising computer instructions for selecting for each wireless base terminal in a select one of the first and second groups a communication path to the MTSO based on at least one of differential delays, path delays and distortions associated with alternative communication paths to the mobile telephone switching office for combinations of wireless base terminals in the select one of the first and second groups.

14. The non-transitory computer-readable storage medium of claim 13, comprising computer instructions for provisioning a plurality of network elements with the communication path for each wireless base terminal in the select one of the first and second groups to exchange messages with the mobile telephone switching office.

15. A server comprising a controller programmed to:
   group a plurality of wireless base terminals (WBTs) into first and second groups that share at least one common wireless base terminal; and
   select a resultant communication path for the at least one common wireless base terminal to a mobile telephone switching office based on differential delays associated with alternative communication paths for combinations of wireless base terminals in at least one of the first and second groups.

16. The server of claim 15, wherein the controller is programmed to select for each wireless base terminal in a select one of the first and second groups a communication path to the mobile telephone switching office based on at least one of differential delays, path delays and distortions associated with alternative communication paths to the mobile telephone switching office for combinations of wireless base terminals in the select one of the first and second groups.

17. The server of claim 16, wherein the controller is programmed to provision a plurality of network elements with the communication path for each wireless base terminal in the select one of the first and second groups to exchange messages with the mobile telephone switching office.

18. The server of claim 15, wherein the controller is programmed to determine the alternative communication paths based on distances between at least a portion of the plurality of wireless base terminals and the mobile telephone switching office.

19. The server of claim 15, wherein the controller is programmed to select the resultant communication path based on path delays calculated for at least a portion of the alternative communication paths.

20. The server of claim 15, wherein the controller is programmed to select the resultant communication path based on distortions calculated for at least a portion of the alternative communication paths.

* * * * *